United States Patent [19]

Strecker

[11] Patent Number: 4,696,447

[45] Date of Patent: Sep. 29, 1987

[54] BLOW DRYER HOLDING DEVICE

[76] Inventor: Dennis Strecker, 1079 Colonial Club Dr., Harahan, La. 70123

[21] Appl. No.: 861,997

[22] Filed: May 12, 1986

[51] Int. Cl.[4] .............................................. F16B 47/00
[52] U.S. Cl. .............................. 248/206.3; 248/309.1; 248/314
[58] Field of Search .................. 248/206.3, 205.5, 467, 248/205.6, 206.1, 206.2, 314, 309.1, 315, 311.2, 291, 293; 211/89, 99, 87

[56] References Cited

U.S. PATENT DOCUMENTS

| | | | |
|---|---|---|---|
| 977,395 | 11/1910 | Norton | 248/206.3 |
| 1,525,138 | 2/1925 | Leath | 211/99 |
| 1,840,763 | 1/1932 | Benchley | 248/206.3 |
| 2,845,245 | 7/1958 | Gray et al. | 248/314 |
| 3,979,096 | 9/1976 | Zieger | 248/75 |
| 4,219,178 | 8/1980 | Assion | 211/89 X |
| 4,225,106 | 9/1980 | Eplan | 248/282 |
| 4,376,521 | 3/1983 | Walters | 248/206.3 |

FOREIGN PATENT DOCUMENTS

| | | | |
|---|---|---|---|
| 1945557 | 9/1969 | Fed. Rep. of Germany | 248/75 |
| 127473 | 2/1950 | Sweden | 248/75 |

Primary Examiner—J. Franklin Foss
Attorney, Agent, or Firm—Jacob Shuster

[57] ABSTRACT

The handle portion of a hair dryer is seated within a retainer and held positioned therein by abutment with a curved backstop depending from the retainer. The retainer and backstop are rigidified by a rib interfitted with and pivotally connected to a rigid projection from a base in alignment with a vertical pivot plane. The base is attached to a vertical support surface by at least two suction cups equally spaced from the pivot plane above the horizontal pivot axis about which the retainer is angularly adjusted to a desired oriented position.

13 Claims, 7 Drawing Figures

BLOW DRYER HOLDING DEVICE

BACKGROUND OF THE INVENTION

This invention relates to the holding of appliances, such as electrical hair dryers or the like, at a desired location and orientation on a vertical surface during use.

The releasable holding of electrical hair blow dryers on a vertical wall surface by means of a holding device is already well known as disclosed for example in U.S. Pat. Nos. 4,219,178 and 4,225,106. Such holding devices include a planar or plate type base attached to a vertical wall surface and rigid arm extensions projecting from the base. According to U.S. Pat. No. 4,219,178, the rigid extension arm has arcuate shaped grip arms which embrace the handle portion of the hair dryer to hold it in a single storage position relative to the base. A releasable detent mechanism is provided to lock the hair dryer in such storage position. According to U.S. Pat. No. 4,225,106, a connector arm and holder plate are pivotally interconnected with the rigid arm extension of the base for angular displacement about two parallel spaced vertical axes. The hair dryer extends through an opening in the holder plate to which it is secured by three straps in order to operatively position the air discharge portion for use. The latter prior art holding device is relatively complex and difficult to adjust, requiring use of both hands. Further, because of the relatively massive nature of the prior art holding devices and heavy hair dryers to be supported, the bases are adapted to be attached to vertical wall surfaces with permanent types of fasteners, such as screws, even though removable suction cup attachments are generally well known.

It is therefore an important object of the present invention to provide a hair dryer holding device that is relatively simple and economical to manufacture, and yet capable of providing reliable support for a hair dryer during use with a greater degree of flexibility as to location and orientation as compared to prior art arrangements.

Yet another object is to provide a hair dryer holding device capable of being adjusted with respect to location and orientation on a vertical support surface with a single hand thereby freeing the other hand for hair management purposes during use of the hair dryer.

A still further object is to provide a hair dryer holding device into which a hair dryer may be inserted or withdrawn with one hand and avoiding use of securing means such as straps and grippers which require additional effort and manipulation.

SUMMARY OF THE INVENTION

In accordance with the present invention, the handle portion of the hair dryer is seated between support arms of a retainer from which an inwardly curved backstop depends in abutment with a substantial length of the handle portion to prevent tilting and thereby operatively position the hair dryer about a vertical axis. The air discharge portion of the hair dryer may be rotated about such vertical axis in a horizontal plane between limits while seated in the retainer and in contact with the backstop. A backing rib projects rearwardly from the retainer and the backstop into interfitting relation with a pivot projection from the base in alignment with a vertical pivot plane through which a single horizontial pivot axis extends. The pivot axis is established by a pivot pin interconnecting the rib and projection between the base and retainer. Adjustable friction means associated with the pivot pin enables the user to position and hold the retainer and backstop in an angularly adjusted position corresponding to a desired orientation of the air discharge portion of the hair dryer relative to the aforementioned vertical pivot plane.

In order to enable the user to select a desired location for the holding device on the vertical support surface, such as a mirror, the base is releasably attached to such surface by at least two suction cups according to one embodiment of the invention. The two suction cups are secured to the back of the base equally spaced from the vertical pivot plane, with which the pivot projection is aligned, and above the pivot axis. A compressive load is exerted by the loaded base on a third suction cup or surface abutment, secured to the base below the pivot axis in alignment with the pivot plane to provide a reliable attachment that is nevertheless readily released to accommodate shift of the holding device to another location on the vertical support surface.

BRIEF DESCRIPTION OF DRAWING FIGURES

Various embodiments of the invention are hereinafter described in greater detail with reference to the accompanying drawings, in which.

DETAILED DESCRIPTION OF PREFERRED EMBODIMENTS

Figure 1:
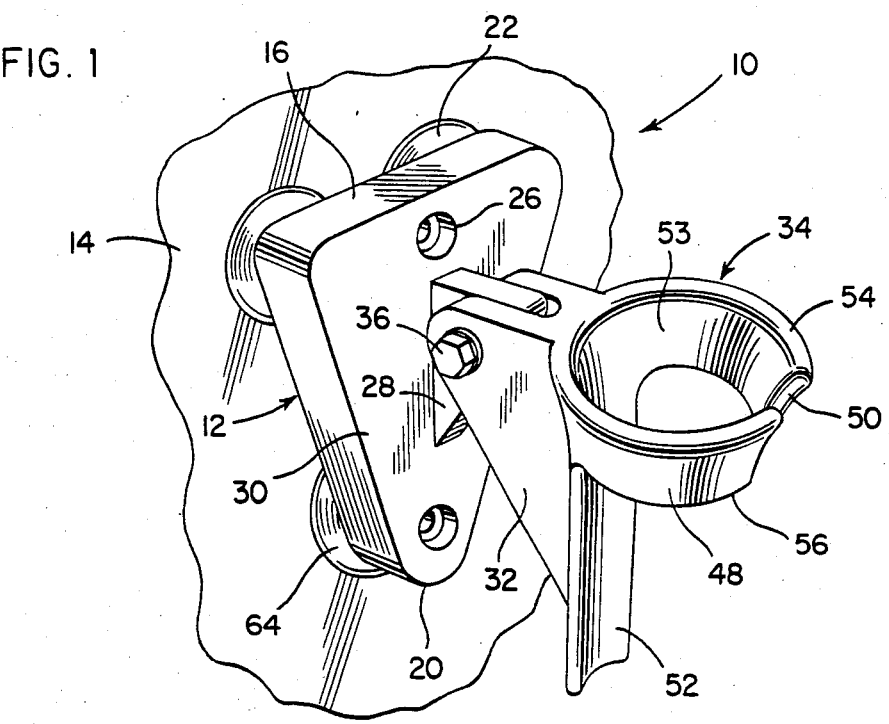
FIG. 1 is a perspective view of the holding device, according to one embodiment, in a typical installation.
Figure 6:
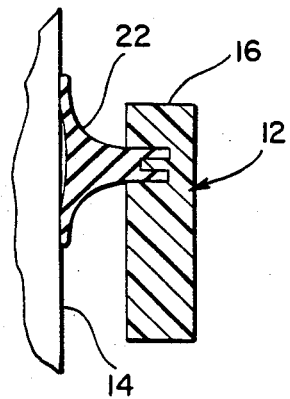
FIG. 6 is a partial section view taken through a plane indicated by section line 6—6 in FIG. 5.

Referring now to the drawings in detail, FIG. 1 illustrates a holding device constructed in accordance with one embodiment of the invention, generally referred to by reference numeral 10. The holding device has a base 12 adapted to be attached to a planar vertical surface of a wall or mirror 14 as shown. In the illustrated embodiment the base is in the form of a plate having a generally triangular shape outlined by an upper edge portion 16 from which converging side edge portions 18 extend toward a vertex portion 20. The base is releasably attached to the mirror surface 14 with its edge portion 16 oriented substantially horizontal by means of at least two suction cups 22 projecting rearwardly from a back face 24 of the base as more clearly seen in FIG. 6. The two suction cups 22 are of a conventional type made of a resilient elastomeric material secured to the back face 24 of the base equally spaced laterally from a reference or pivot plane centrally intersecting the base to bisect the edge portion 16 and extend through the vertex portion 20. A pair of optional fastener holes 26 may be formed in the base on its intersection with the pivot plane adjacent the edge and vertex portions as shown in FIG. 1.

A pivot projection 28 extends forwardly from the front face 30 of the base in interfitting relation to a backing rib formation 32 projecting rearwardly from an associated appliance retainer assembly 34. In the illustrated embodiment, the pivot projection 28 and rib formation 32 are generally in the shape of right triangles with upper leg portions aligned perpendicular to the front face 30 of the base and vertical leg portions formed integral with the base 12 and assembly 34, respectively. The rib formation 32 is also clevis-shaped in cross-section so as to interfit with an overlapping portion of the projection 28. The aforementioned pivot plane extends centrally through the interfitted projection and rib formation and is perpendicular to an intersecting pivot axis extending through aligned openings in the overlapping portions of the projection and rib to receive a pivot pin assembly generally referred to by reference numeral 36. The pivot pin assembly, projection 28 and rib 32 thus form a pivotal connection between the base and retainer assembly 34 to accommodate angular displacement of the retainer assembly 34 in the pivot plane about the pivot pin axis to an adjusted position.

Figure 4:
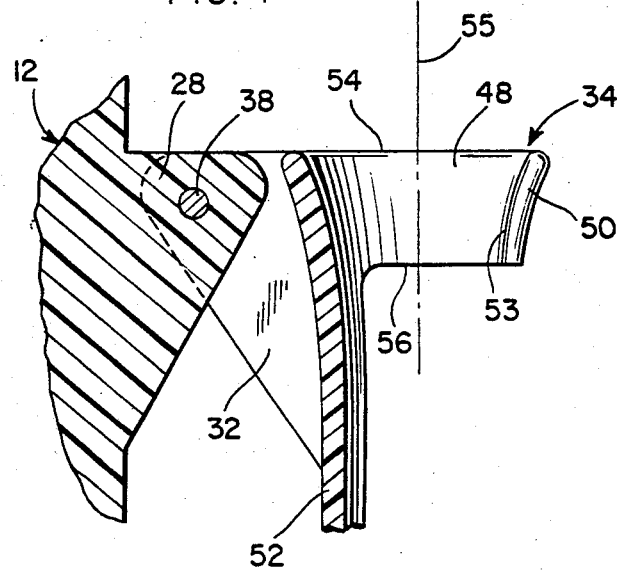
FIG. 4 is an enlarged partial section view taken through a plane indicated by section line 4—4 in FIG. 3.
Figure 5:
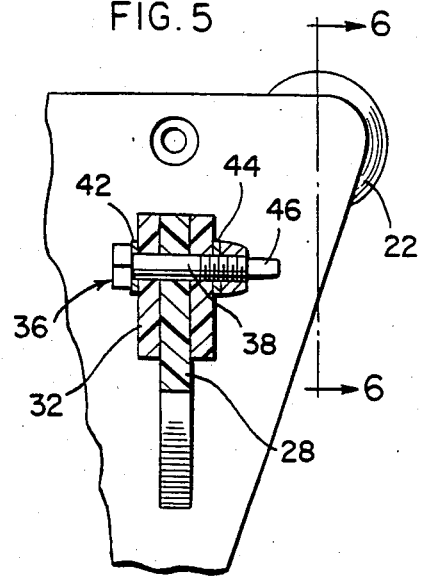
FIG. 5 is an enlarged partial section view taken through a plane indicated by section line 5—5 in FIG. 3.

As more clearly seen in FIGS. 4 and 5, the pivot pin assembly 36 includes an externally threaded pivot pin 38 having a head 40 at one end. The projection 28 and rib 32 are frictionally held in angularly adjusted position between washers 42 and 44 on the pivot pin abutting the head 40 and an internally threaded hub portion of a wing nut lock member 46. The wing nut 46 may therefore be threaded on the pivot pin 38 to adjust the frictional force holding the retainer assembly 34 in any inclined position to which it was previously displaced.

As shown in FIGS. 1-4, the retainer assembly 34 includes an arcuate member forming a pair of support arms 48 spaced by a gap between adjacent ends 50. An elongated, inwardly curved backstop 52 having a relatively small arcuate cross-section as shown depends from the arcute member in substantially 180° relation to the gap between the ends 50 of the support axis 48. The arcuate member has an internally concial surface 53 converging downwardly from an upper edge 54 to the lower edge 56 of the support arms. The conical surface 53 is dimensioned to receive therethrough the handle portion 58 of a conventional blow dryer 60 as shown by dotted lines in FIG. 2. The curvatures of the cross-sectionally arcuate abutment surface of backstop 52 and the conical surface 53 have centers substantially aligned along a vertical axis 55 (shown in FIGS. 2 and 4) about which the hair dryer may be rotated within limits while seated in the retainer. The enlarged intermediate fan portion of the hair dryer will rest on the upper edge 54 with the handle portion in engagement with the backstop 52 on the rear side of vertical axis 55 to prevent the hair dryer from tilting rearwardly and laterally relative to the retainer support arms and to accommodate the aforesaid rotation about the vertical axis 55. The forwardly extending air discharge portion of the hair dryer may thereby be angularly oriented while the handle portion 58 remains in contact with the backstop. The rib 32 rigidifies the retainer 34 and backstop 52 at the pivot plane as well as to form part of the pivotal connection between the retainer and the base 12.

Figure 2:
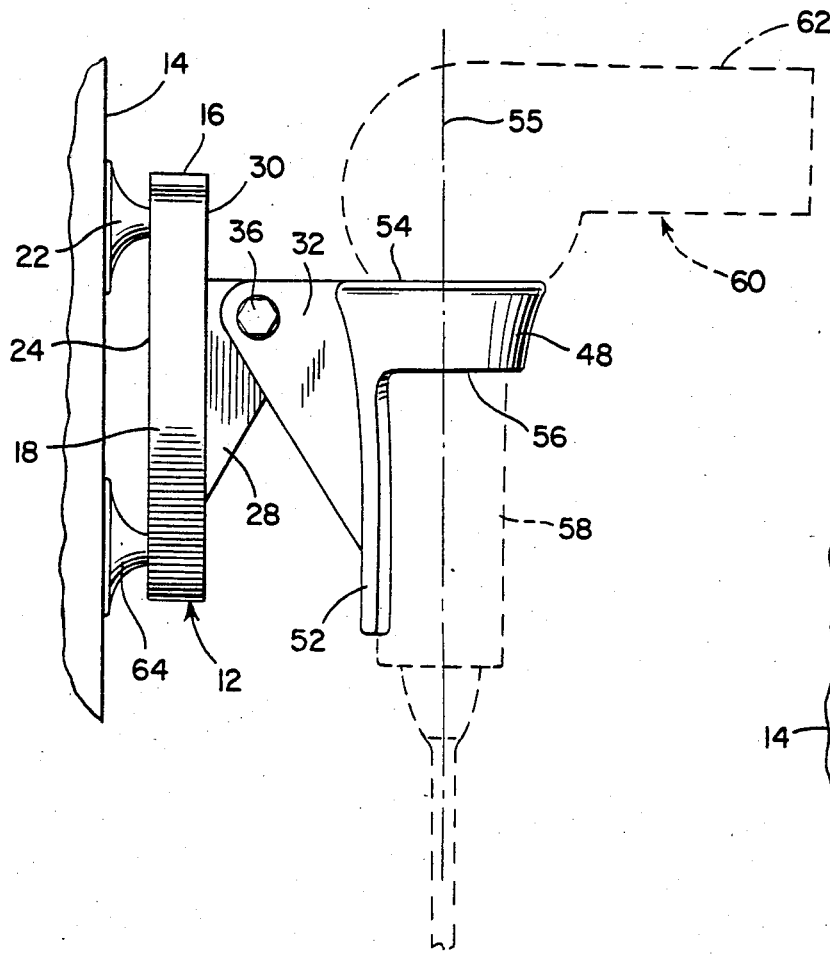
FIG. 2 is a side elevation view of the holding device shown in FIG. 1, with a conventional hair dryer (shown in dotted line) positioned therein.
Figure 7:
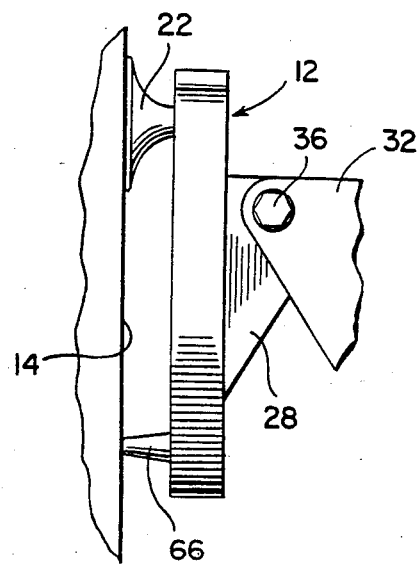
FIG. 7 is a partial side elevation view showing a modification of the holding device shown in FIG. 2.
Figure 3:
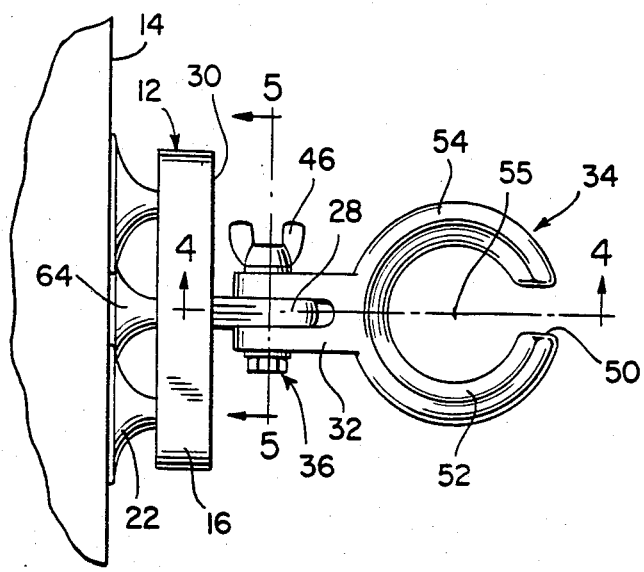
FIG. 3 is a top plane view of the holding device shown in FIGS. 1 and 2.

In the embodiment shown in FIGS. 1-3, the base 12 is attached to mirror surface 14 by the two suction cups 22 equally spaced on either side of the central pivot plane above the pivot axis through which the base is loaded. A third suction cup 64 is mounted on the base in alignment with the pivot plane below the pivot axis. Such a three point attachment will provide reliable support and prevent unintended slidable and angular shift of the holding device. As an alternative, the suction cup 64 may be replaced by a resilient abutment 66 as shown in FIG. 7 through which a compressive load is exerted on the support surface in view of the loading moment established by the two upper suction cups 22.

To use the holding device, the base 12 may be slid along the mirror surface 14 to a desired location and then pressed toward the mirror to activate the suction cups and obtain adhesion. With a single hand, the handle portion 58 of the hair dryer 60 may then be inserted into the retainer from above with the cord extending inserted through the gap between the support arms 48. The air discharge portion of the hair dryer is angularly adjusted horizontally about the vertical axis 55 through the retainer, which may also be adjusted vertically to a desired orientation relative to the vertical pivot plane by overcoming the frictional holding force of the pivot plane assembly 36.

Having thus described certain embodiments of the invention in detail, it will be understood that various changes and modifications may suggest themselves to persons skilled in the art, all falling within the scope of the invention as defined by the appended claims.

What is claimed is:

1. A device for holding a portable hair dryer on a vertical surface, the hair dryer having a rigid handle portion and an air discharge portion, said holding device including a base, means for attaching the base to the vertical surface and retainer means for receiving the handle portion of the hair dryer in spaced relation to the base, the improvement comprising means pivotally connecting the retainer means to the base for angular displacement about a pivot axis to an adjusted position, frictional means connected to the pivotal connecting means for holding the retainer means in said adjusted position and elongated abutment means depending from the retainer means in engagement with the handle portion for maintaining the air discharge portion of the hair dryer operatively oriented about vertical axis within the retainer means.

2. The combination of claim 1 wherein said elongated abutment means includes surface means engageable by the hair dryer for establishing said vertical axis about which the hair dryer is angularly displaceable.

3. The improvement as defined in claim 1 wherein the retainer means comprises an arcuate member having support arms spaced from each other by a gap.

4. The improvement as defined in claim 3 wherein said arcuate member forms an internal, downwardly converging conical surface between upper and lower edges of the support arms.

5. The improvement as defined in claim 4 wherein the elongated abutment means comprises a curved backstop extending downwardly from the arcuate member between the support arms in substantially 180° relation to the gap.

6. The improvement as defined in claim 5 wherein said pivotal connecting means comprises a backing rib extending from the retainer means in alignment with a pivot plane in perpendicular intersecting relation to the pivot axis, a projection extending from the base in interfitting relation to the rib and a pivot pin extending along said pivot axis through the rib and the interfitting projection.

7. The improvement as defined in claim 6 wherein the frictional means includes means mounted on the pivot pin for clamping engagement with the rib and the projection.

8. The improvement as defined in claim 7 wherein the attaching means comprises at least two suction cups secured to the base in laterally spaced relation to the pivot plane and above the pivot axis and resilient means secured to the base for abutment with the vertical surface below the pivot axis substantially at an intersection of the pivot plane with the vertical surface.

9. The improvement as defined in claim 8 wherein said resilient means is an additional suction cup.

10. The improvement as defined in claim 1 wherein said pivotal connecting means comprises a backing rib extending from the retainer means in alignment with a pivot plane in perpendicular intersecting relation to the pivot axis, a projection extending from the base in interfitting relation to the rib and a pivot pin extending along said pivot axis through the rib and the interfitting projection.

11. The improvement as defined in claim 10 wherein the frictional means includes means mounted on the pivot pin for clamping engagement with the rib and the projection.

12. The improvement as defined in claim 10 wherein the attaching means comprises at least two suction cups secured to the base in laterally spaced relation to the pivot plane and above the pivot axis and resilient means secured to the base for abutment with the vertical surface below the pivot axis substantially at an intersection of the pivot plane with the vertical surface.

13. The improvement as defined in claim 12 wherein said resilient means is an additional suction cup.

* * * * *